United States Patent [19]

Gravesteijn et al.

[11] Patent Number: 4,818,666
[45] Date of Patent: * Apr. 4, 1989

[54] ERASABLE OPTICAL RECORDING ELEMENT AND METHOD OF OPTICALLY RECORDING AND ERASING INFORMATION

[75] Inventors: Dirk J. Gravesteijn; Carlus J. Van Der Poel, both of Eindhoven, Netherlands

[73] Assignee: U.S. Philips Corporation, New York, N.Y.

[*] Notice: The portion of the term of this patent subsequent to Mar. 3, 2004 has been disclaimed.

[21] Appl. No.: 869,484

[22] Filed: Jun. 2, 1986

[30] Foreign Application Priority Data

Mar. 28, 1986 [NL] Netherlands ............................ 8600811

[51] Int. Cl.$^4$ ................................................. G03C 1/72
[52] U.S. Cl. ....................................... 430/495; 430/19; 430/346; 430/945; 430/964; 346/135.1
[58] Field of Search ................. 430/19, 495, 346, 945, 430/964; 346/135.1, 76 L

[56] References Cited

U.S. PATENT DOCUMENTS 4,637,976 1/1987 Terao et al. ..................... 430/964
4,647,944 3/1987 Gravesteijn et al. .............. 430/945

FOREIGN PATENT DOCUMENTS 0177446 9/1985 Japan ............................... 430/495

Primary Examiner—Paul R. Michl
Assistant Examiner—Lee C. Wright
Attorney, Agent, or Firm—Norman N. Spain

[57] ABSTRACT

Erasable optical recording element according to FIG. 1 having a substrate 1 and a recording layer 4 which is provided thereon and which satisfies the formula $(QSb)_{100-x}M_x$, wherein Q is the element Ga or In, M is a metal or chalcogenide element and x has the value 2–15, as well as a method of optically recording and erasing information in which under the influence of pulsated laser light amorphous info areas 10 are formed in the recording layer 4, which areas can be reverted by laser light to the crystalline phase and can be erased.

6 Claims, 1 Drawing Sheet

ERASABLE OPTICAL RECORDING ELEMENT AND METHOD OF OPTICALLY RECORDING AND ERASING INFORMATION

BACKGROUND OF THE INVENTION

The invention relates to an erasable optical recording element having a substrate and a recording layer provided thereon in which information bits in the form of amorphous areas in crystalline surroundings are formed by exposure to modulated laser light, which information bits can be read optically and can be reconverted into the crystalline phase by exposure to laser light and are thus erased.

An erasable optical recording element of this type the operation of which is based on crystalline-amorphous transitions (phase change) is known, for example, from European patent application No. 0 135 370 and from the co-pending Netherlands patent application No. 8403817 in the name of the Applicants. In the known recording elements a Te-Se alloy which may be include other elements is used as the recording material. The known recording material such as a Te-Se-Sb alloy has as an disadvantage that the erasing time, i.e. the exposure time which is necessary to revert the amorphous information area to the original crystalline phase, is long. For example, the erasing time of a Te-Se-Sb alloy is, for example, 50 μs.

During recording information, reading the information and erasing the information, the recording element is rotated. The linear speed of the elements is, for example, from 1 m/s to 15 m/s or more. For example, upon recording audio information according to the EFM (eight out of fourteen) modulation system a linear disc (element) speed is used of 1.4 m/s. For video information a linear speed of 10 to 15 m/s is used.

It is highly desirable to perform the erasing process at the same linear disc speed as the recording process, i.e. erasing in real time. It is furthermore desirable to be able to erase the information during one rotation of the element. For the practical application this provides very interesting possibilities to record new information directly over the existing information, the new information being recorded immediately after the existing information has been erased at the same disc speed and in the same run of the element. Such a direct re-recording (overwrite) process cannot be realized in magneto-optical recording processes in which at least one complete revolution of the recording element lies between erasing and re-recording.

In phase change recording with the above-mentioned erasing time of 50 μs, an erasing process in real time within one revolution of the element is also not practically possible. Even at a very low linear disc speed of 1.4 m/s a slot-shaped erasing spot having a length of 70 μm must be used. The erasing spot is the light spot of the laser light beam on the recording layer used in the erasing process. There are considerable practical objections to the use of an erasing spot of 70 μm due to the required high laser power as well as the positioning of the spot on the track. At higher disc speeds, even an erasing spot having a length in the order of magnitude of mm is necessary, which is practically not possible.

SUMMARY OF THE INVENTION

It is an object of the invention to provide an erasable optical recording element in which very short erasing times may be used.

A further object according to the invention is an erasable optical recording element in which the information can be written at a high recording speed and with a high information density.

Still another object is an erasable optical recording element which is stable for a very long period of time and may be used for many years also in varying climatological conditions of air humidity and ambient temperature.

According to the invention these objects are achieved by means of an erasable optical recording element of the type mentioned in the opening paragraph which is characterized in that the composition of the recording layer satisfies the formula

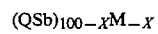

wherein
Q is the element In or Ga
M is a metal or chalcogenide element and
x has the value 2–15
The numerical values given are atomic weight percentages.

The metal or chalcogenide indicated by M is selected from the group consisting of Mo, W, Ta, Ni, Pd, Pt, Cu, Ag, Au, Zn, Cd, Al, Tl, Si, Ge, Sn, Pb, As, Bi, S, Se and Te.

DETAILED DESCRIPTION OF THE INVENTION

Figure 1:
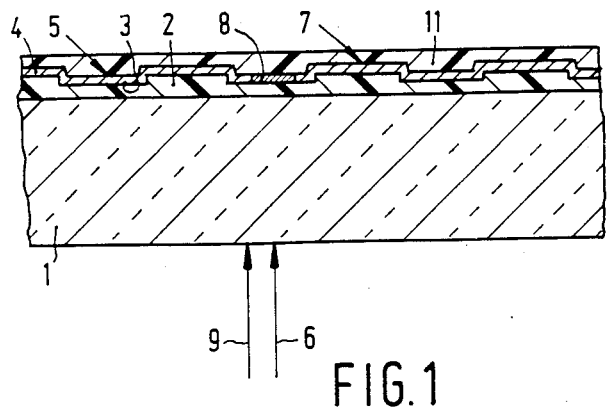
FIG. 1 is a cross-sectional view of a recording element of the invention.

The invention will now be described in greater detail with reference to the drawing:

It is of importance for the element M not to fit in the crystal lattice of the compound QSb. The atomic weight ratio of Q and Sb preferably lies between 60:40 and 40:60. In particular a 50:50 ratio is used. Very short erasing times of, for example, 100 ns or even shorter can be realized by means of a recording layer of the above-mentioned type. The recording material used in the element according to the invention provides the important advantage that the erasing time necessary to crystallize an amorphous area is adjustable and depends on the quantity of the element M in the recording material. With small quantities of M, for example, an atomic weight percentage smaller than 5%, a very short erasing time is obtained. By choosing a higher percentage of M a longer erasing time may be employed, hence a lower crystallization speed. A lower crystallization speed is of importance when the recording speed is low, therefore at a comparatively low speed of the element.

It is therefore possible at the various speeds of the element, in accordance with the use of the element for audio recording, video recording and data recording, not to adapt, or not to vary exclusively, the size of the erasing spot but also to vary the erasing time by a variation of the M content of the recording layer. The limits of the M content lie at 2 and 15 at.%. With a M content smaller than 2 at.% the speed of crystallization is so high that crystalline-amorphous transitions are not possible any longer and the recording process no longer operates. With M contents exceeding 15 at.% the speed of crystallization is so low that real time erasing is no longer adequately possible.

The composition of the recording layer may be chosen to be so that extremely short erasing times are realised, hence very high crystallization speeds. Such a material can be erased at any disc speed. However, it is to be preferred, in order to employ the recording process, at lower disc speeds, to use a material having a longer crystallization time.

The recording layer used in the element according to the invention has an excellent stability not only in the crystalline phase but also in the amorphous phase. The stability of the amorphous phase against crystallization is established by means of a standard DSC (differential scanning calorimetry) test. It has been found that for the substance $(InSb)_{95}Te_5$ the crystallization time of the amorphous phase at 50° C. is $3 \times 10^5$ years. At 100° C. the crystallization time is 8 years. Hence the recording element is clearly very highly stable.

In a preferred form of the element according to the invention the composition of the recording layer satisfies the formula

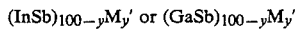

wherein
M' is selenium or tellurium, and
y has the value 2–12 and preferably 4–10.

Very suitable recording layers satisfy the formulae $(InSb)_{95}Te_5$, $(InSb)_{95}Se_5$, $(InSb)_{90}Te_{10}$ and $(InSb)_{90}Se_{10}$. These materials have a slightly lower melting-point than the corresponding Ga-containing layers as a result of which the recording of information and the erasing of information is more favourable energetically.

The invention furthermore relates to a method of optically recording and erasing information in which a disc-shaped recording element which comprises a substrate and a recording layer of the formula $(QSb)_{100-x}M_x$ provided thereon, in which formula Q, M and x have the meanings as given previously, is rotated and exposed to a recording spot which is moved diametrically over the element and originates from a laser light beam which is focused on the recording layer and is pulsated in accordance with the information to be recorded, the crystalline recording material in the exposed places being converted into amorphous information areas which are read in reflection by means of continuous energetically weak laser light, the recorded information being erased in real time during one revolution of the recording element by exposure to an erasing spot which is also moved diametrically over the element and originates from a continuous laser light beam focused on the recording layer, an amorphous information area being reconverted to the original crystalline condition as a result of the exposure.

The linear speed of the rotating element depends on the type of information which is recorded, for example audio information, video information or data information, and is, for example from 1 to 20 m/s. During the recording process the crystalline recording material in the exposed places is heated above the melting temperature, as a result of which a melting area is formed which cools so rapidly that no crystallization takes place and an amorphous information area is formed. The information is recorded at high speed. The pulse time of the laser light beam in which per pulse an information area is formed is short and is, for example, from 20–100 ns. The formed amorphous information areas have small diametrical dimensions of at most one or a few micrometers so that a high information density is obtained.

In the erasing process the amorphous information areas are exposed by the erasing spot. As a result of this an amorphous area is heated to a temperature which is slightly lower than the melting-point of the material in the crystalline phase but is higher than the glass transition temperature. As a result of this the amorphous material of such an area becomes less viscous and will return to the thermodynamically more stable crystalline state. The material will have to be kept at the above-mentioned temperature for some time (erasing time) in order to crystallize all the material in such an area.

The method according to the invention presents the possibility of using very short erasing times. In a preferred form of the method the erasing time per information area is from 50 ns to 5 μs and in particular from 100 ns to 1 μs.

In a further preferred form of the method according to the invention an erasing spot is used which is circular or elliptical and has a maximum diametrical or longitudinal dimension of 3 μm. In particular a circular erasing spot is used having a diameter of 1–2 μm. The required laser power is lower. Such a small circular erasing spot, compared with a slot-shaped erasing spot, presents the further advantage of a better focusing on the recording layer and a better control over the information track.

In this connection it is to be noted that the recording element is preferably provided with an optically detectable spiral-like track for good control of the recording process and erasing process. This track is present, for example, in the form of a groove in the surface of the substrate on the side of the recording layer. In the case of a synthetic resin substrate the groove may be provided during the manufacture of the substrate. A suitable manufacturing process is an injection moulding or a compression moulding process in which the hot liquid synthetic resin is injected into a mould which comprises a matrix which at its surface has the negative of the desired groove structure. In the case of a substrate of, for example, glass the groove is provided in a separate layer of synthetic resin on the surface of the substrate. The groove is detected optically by means of laser light which is irradiated via the transparent substrate. The light reflected against the recording layer shows phase differences depending on whether the light has been reflected against a groove part or against a dike part situated beside the groove. The information recorded in the recording element usually is in the groove part of the recording layer so that a spiral-like information track is formed.

A circular small erasing spot can easily be kept to the desired portion of the information track. With a slot-like erasing spot the possibility exists that in the case of some rotation of the spot an adjacent spiral part of the information track is exposed and an undesired erasing process takes place.

The recording and erasing of information is carried out by means of a laser light beam which is preferably focused on the recording layer via the substrate. Herewith it is achieved that dust particles or scratches present on the substrate fall beyond the depth of focus of the focusing objective so that these contaminations do not influence the quality of recording and erasing. In this case the substrate must be transparent and be manufactured, for example, from glass or a transparent synthetic resin, for example, polycarbonate or polymethylmethacrylate.

The circular small erasing spot may be used at any currently employed speed of the recording element because, as has already been stated the composition of the recording layer may be adapted to the exposure time in the erasing process determined by spot size and disc (element) speed. For example, at a low disc speed of say 1.5 m/s and a spot size of 2 $\mu$m, which means an exposure time of 1.3 $\mu$s it will be possible to select a composition of the recording layer having a comparatively high content of the element M, in particular Se or Te. This material has a comparatively low crystallization speed. With a disc-speed of 15 ms and an erasing spot size of 2 $\mu$m, hence with an exposure time of approximately 135 ns, a recording layer will be used which has a comparatively low content of the element M and hence crystallizes much more rapidly and consequently has a short erasing time.

A further favourable embodiment of the method according to the invention is characterized in that substrate is provided by means of an electroless deposition process with an amorphous recording layer in which, by using the erasing spot, a spiral-like track of crystalline material is formed, which track has a width of a few microns, amorphous information areas are then formed in the track by means of a pulsated recording spot, which areas can again be converted selectively by means of the erasing spot into the crystalline phase and are thereby erased.

A suitable deposition process is a vapour deposition process at reduced pressure or a sputtering process in which an amorphous recording layer is obtained. This favourable embodiment presents the advantage that not the whole recording layer has to be converted from the amorphous phase into the crystalline phase in a separate treatment step.

An erasing spot is preferably used which is followed at some distance by the recording spot. A suitable mutual distance is, for example, from 5 to 50 $\mu$m. Herewith the possibility is presented of rewriting new information directly on old information.

Another preferred form is characterized in that the erasing spot and the recording spot originate from the same laser, the laser being switched at a higher power and pulsated during the writing process.

For a better understanding of the invention a preferred embodiment will now be described with reference to the drawing.

Reference numeral 1 in FIG. 1 denotes a glass substrate, the substrate has the shape of a circular disc having a diameter of 30 cm and a thickness of 1-2 mm. The surface of the substrate 1 comprises a layer 2 of a UV light-cured acrylate synthetic resin in which a spiral-like groove 3 has been provided. The groove has a width of 1.6 $\mu$m and a depth of 60 nm. Lacquer layer 2 with groove 3 is manufactured by providing substrate 1 with a layer of a liquid, UV light-curable lacquer, pressing the whole against the matrix surface which comprises a groove structure, exposing the liquid lacquer layer via the substrate to UV light, and removing the assembly of substrate with cured lacquer layer in which the groove structure has been copied from the matrix surface.

A recording layer 4 of $(InSb)_{95}Te_5$ is vapour deposited on lacquer layer 2 at a pressure of $3 \times 10^{-5}$ Torr by means of a flash evaporator. The speed of evaporation is 0.6 nm per second. The thickness of the vapour deposited layer 4 is 100 nm. During the vapour deposition the substrate 1 is rotated at a frequency of 20 Hz. Chemical analysis of the vapour-deposited layer indicates that the correct composition is $In_{42}Sb_{53}Te_5$. Examples of other recording layers used are $(InSb)_{98}Te_2$; $(InSb)_{96}Se_4$; $(GaSb)_{95}Te_5$; $(GaSb)_{95}Se_5$; $(InSb)_{95}Se_5$; $(InSb)_{90}Se_{10}$; $(InSb)_{90}Te_{10}$; $(GaSb)_{90}Te_{10}$; $(GaSb)_{90}Se_{10}$; $(InSb)_{86}Te_{14}$; $(InSb)_{86}Se_{14}$; $(GaSb)_{85}Te_{15}$; $(GaSb)_{85}Se_{15}$.

The recording layer 4 is covered by a protective layer 11 of a synthetic resin.

After vapour deposition the layer 4 has an amorphous structure. The groove part 5 of the recording layer 4 is exposed to the light of a continuous laser light beam 6 which is focused on the recording layer 4 via the substrate 1. The laser used has a power of 5 mW on the recording layer. The laser light beam produces a light spot on the recording layer, the so-called erasing spot, which is circular and has a cross-section of 2 $\mu$m. The erasing spot follows the groove part 5 by using a servo-system (control system) not shown in which a weak laser light beam is used which is reflected against the layer 4 via the substrate 1 and which scans the groove structure on the basis of phase differences between reflected light originating from groove 5 and dike part 7. During the exposure to the erasing spot the disc 1 is rotated, the linear speed at the area of the erasing spot being 5 m/s. As a result of the exposure to the erasing spot a track 8 of crystalline recording material is formed in the groove part 5. Said conversion from the amorphous to the crystalline phase takes place during one revolution of the disc 1.

During or after this erasing stroke, information can be recorded in track 8. For this purpose, track 8 is exposed to pulsated laser light 9 which is focused on track 8 via substrate 1. The pulsated laser light beam 9 produces a light spot (recording spot) on the recording layer 4 at the area of the crystalline track 8. The light spot is circular and has a diameter of 2 $\mu$m. The pulse time is 100 ns. The laser light energy per pulse is 0.6 nJ. The laser light beam 9 is controlled and kept at the track 8 by means of the servo-system and not shown. During recording information the disc 1 is rotated, the linear speed at the area of the recording spot being 5 m/s. Erasing and recording hence take place in real time, during one revolution of the disc. This may be the same revolution. In order to obtain the recording spot the same laser may be used as was used in the erasing process. Said laser is then switched temporarily at a higher power and moreover is pulsated in behalf of the recording process. Alternatively, a second laser may be used for the recording process. In that case the recording spot can follow the erasing spot at a very short distance, for example a distance of 30 $\mu$m. As a result of the exposure to the recording spot amorphous information areas 10 (see FIG. 2) having a diameter of approximately 1 $\mu$m are formed in the crystalline track 8. The information areas 10 can be erased selectively and hence be converted again into the crystalline phase by using the above-described erasing spot. Erasing occurs in real time with a linear disc speed of 5 m/s. The erasing time per amorphous area is 400 ns. The amorphous information areas are read by weak continuous laser light which is reflected against the recording layer via the substrate 1. Reading is based on the differences in reflection i.e. differences in intensity of the reflected light, between an amorphous information area and the crystalline surroundings thereof (track 8).

The above erasing-recording process has been repeated 400 times without any problems occurring.

In the same manner as described above information can be recorded and erased at a different speed of the substrate (disc)1, for example, a recording speed of 12 m/s. In that case an erasing spot is used having a circular (round) shape and a diameter of 2 μm originating from a laser having a power of 16 mW on the recording layer. During the selective erasing of the recorded amorphous information areas, the erasing time per information area is approximately 170 ns. Information is recorded by means of pulsated laser light having a pulse time of 55 ns and a pulse energy of 0.6 nJ.

Experiments have demonstrated that this rapid recording-erasing process can be repeated 800 times without any problems.

Figure 2:
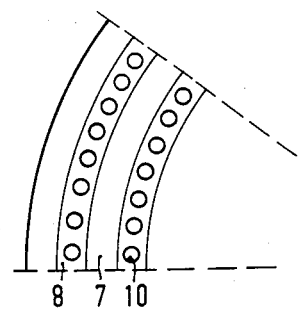
FIG. 2 is a plan view of a segment of the element shown in FIG. 1.
Figure 3:
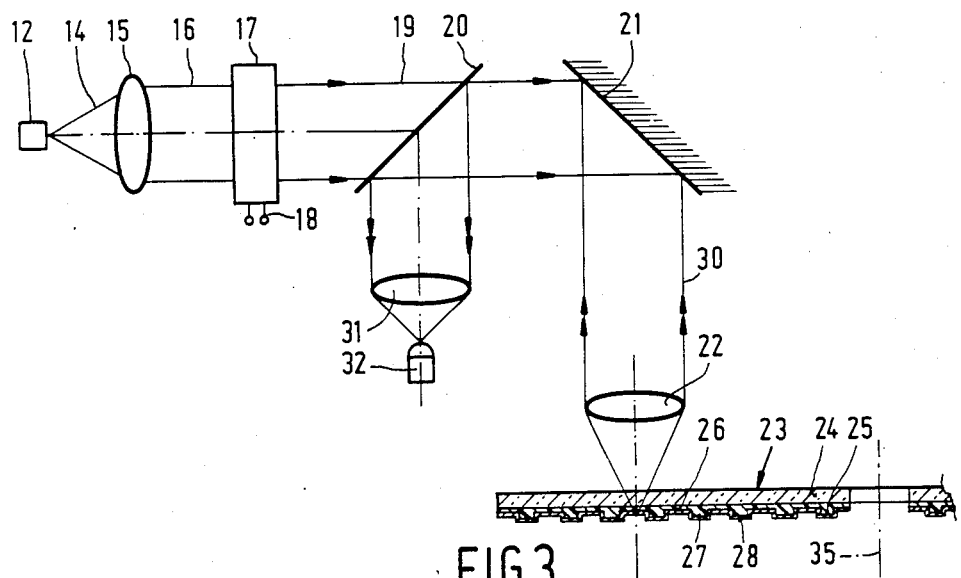
FIG. 3 is a diagrammatic cross-sectional view of a device for carrying out the method of the invention.

Reference numeral 12 in FIG. 3 denotes a laser. Parallel to laser 12 a second laser 13 is accomodated (see FIG. 5). The light beam 14 of laser 12 passes through a lens 15 and is converted into a parallel beam 16 which then traverses a modulator 17. The modulator serves as a light shutter controlled by binary (digital) signals on connection pins 18. The electric signals represent the information to be recorded. The laser light beam 16, upon passage through modulator 17, is pulsated in accordance with the binary information to be recorded. It is also possible to pulsate the laser 12 directly, without the interconnection of a separate modulator, in accordance with the data to be recorded. This is the case when an AlGaAs laser having an emission wavelength of 850 nm is used. The pulsated laser light beam 19 passed through a semitransmissive mirror 20 and is then rotated through 90° by reflection against mirror 21. The beam 19 is focused by an objective 22 on a recording element 23 which corresponds to the recording element shown in FIGS. 1 and 2. The recording element 23 comprises a glass substrate 24 which has a lacquer lever 25 in which a groove 26 is provided. A dike part 27 is present between the grooves. Lacquer layer 25 comprises a recording layer 28 as stated in the description of FIGS. 1 and 2. The pulsated laser light beam 19 is focused via the substrate 24 in the groove part of the recording layer 28 and gives a pulsated light spot (recording spot) 29 on the recording layer (see FIG. 4). The recording element 23 is rotated about an axis 35, the linear speed of the element at the area of the recording spot being adjusted at a value which generally lies between 1 and 15 m/s.

In the places exposed by recording spot 29 amorphous information areas are formed as has been explained in the description of FIGS. 1 and 2. The amorphous information areas are read with a weak continuous laser light which is focused on the groove part 26 of the recording layer 28 according to the same optical path as is shown in FIG. 3. The reflected light beam 30 is received via mirror 21, semitransmissive mirror 20 and lens 31 in detector 32 in which on the basis of reflection differences the place and length of the information areas are determined and converted into, for example, an electrical signal.

Figure 4:
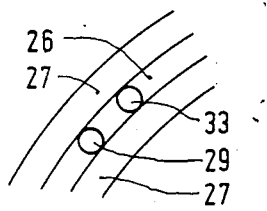
FIG. 4 is a plan view of a part of the recording element in the device shown in FIG. 3
Figure 5:
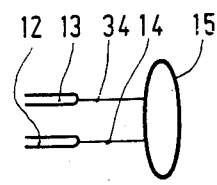
FIG. 5 is a plan view of the laser arrangement in the device shown in FIG. 3.

The amorphous information areas are present in a track of a crystalline material provided in the groove part 26 of the recording layer 28 by using an erasing spot 33 (FIG. 4). In the situation shown in FIGS. 3, 4, 5, the erasing spot originates from a second laser 13 which produces a continuous light beam 34 which traverses substantially the same light path as beam 14 with the proviso that the produced erasing spot 33 is moved over a distance of approximately 30 μm with respect to the recording spot 29. The erasing spot 33 precedes the recording spot 29 so that first a crystalline track is formed in the amorphous recording layer and then the amorphous information areas are provided herein. The amorphous information areas can be erased selectively by the erasing spot in real time during one revolution of the element by conversion into the crystalline phase.

What is claimed is:

1. A method for the optical recording and erasing of information in which a disc-shaped recording element which comprises a substrate and a recording layer provided thereon of the crystalline recording material of the formula $(QSB)_{100-x}M_x$, wherein Q is In or Ga, M is a metal or a chalcogenide element and $x=2-15$ is rotated and exposed to a recording spot which is moved diametrically over the element and originates from a laser light beam which is focused on the recording layer and is pulsated in accordance with the information to be recorded, the crystalline recording material in the exposed places being converted into amorphous information areas which are read in reflection by means of continuous energetically weak laser light, the recorded information being erased in real time during the revolution of the recording element by exposure to an erasing spot which is also moved diametrically over the element and originates from a continuous laser light beam focused on the recording layer, amorphous information areas being reverted to the original crystalline state as a result of the exposure to said erasing spot.

2. A method as claimed in claim 1, characterized in that the information is erased by means of an erasing spot which is circular or elliptical and has a maximum diametrical or longitudinal dimension of 3 μm.

3. A method as claimed in claim 1 or 2, characterized in that the erasing time per information area is 50 ns–5 μs and in particular 100 ns–1 μm.

4. A method as claimed in claim 1, characterized in that the substrate is provided with an amorphous recording layer by means of an electroless deposition process in which layer a spiral-like track of crystalline material is formed by using the erasing spot, which track has a width of a few microns, amorphous information areas are then formed in said track by means of a pulsated recording spot, which areas can be converted again selectively by means of the erasing spot into the crystalline phase and be erased.

5. A method as claimed in claim 4, characterized in that the erasing spot is succeeded at a small distance by the recording spot.

6. A method as claimed in claim 4, characterized in that the erasing spot and the recording spot originate from the same laser, the laser during the recording process being switched at a higher power and being pulsated.

* * * * *